United States Patent [19]
Frampton

[11] Patent Number: 5,740,129
[45] Date of Patent: Apr. 14, 1998

[54] REAL TIME CLOCK

[75] Inventor: Simon Frampton, Surrey, England

[73] Assignee: Nokia Mobile Phones Limited, Salo, Finland

[21] Appl. No.: 597,619

[22] Filed: Feb. 6, 1996

[30] Foreign Application Priority Data

Feb. 7, 1995 [GB] United Kingdom ............... 9502350

[51] Int. Cl.⁶ .................................................. G04B 45/00
[52] U.S. Cl. ............................ 368/10; 368/47; 368/200
[58] Field of Search ............................ 368/10, 200-202, 368/47-60

[56] References Cited

U.S. PATENT DOCUMENTS

| | | | |
|---|---|---|---|
| 4,305,041 | 12/1981 | Frerking | 328/155 |
| 5,272,650 | 12/1993 | Adams et al. | 331/1 A |

FOREIGN PATENT DOCUMENTS

| | | |
|---|---|---|
| 0305200 A2 | 3/1989 | European Pat. Off. . |
| 351230 A2 | 1/1990 | European Pat. Off. . |
| 0461849 A2 | 12/1991 | European Pat. Off. . |
| 0499440 A2 | 8/1992 | European Pat. Off. . |
| 0509649 A2 | 10/1992 | European Pat. Off. . |
| 0560320 A1 | 9/1993 | European Pat. Off. . |
| 0586256 A2 | 3/1994 | European Pat. Off. . |
| 0619685 A2 | 10/1994 | European Pat. Off. . |
| 0622966 A1 | 11/1994 | European Pat. Off. . |
| 1410396 | 10/1975 | United Kingdom . |
| 2019054 | 10/1979 | United Kingdom . |
| 2167254 | 5/1986 | United Kingdom . |
| WO 91/16670 | 10/1991 | WIPO . |
| WO 95 10141 | 4/1995 | WIPO . |

*Primary Examiner*—Bernard Roskoski
*Attorney, Agent, or Firm*—Perman & Green, LLP

[57] ABSTRACT

A real time clock is arranged to generate output signals indicative of time of day. An oscillating device (101) produces a first clocking signal which is adjusted in response to a calibration value to produce an output clocking signal. A processor (102) re-calculates the calibration value in response to external clocking signals received from a cellular base station for mobile telephones. The clock may be provided within a mobile telephone and the oscillating device may also be used to provide sleep clock signals allowing a high frequency system clock to be de-activated for periods while the telephone is in a stand-by condition.

17 Claims, 5 Drawing Sheets

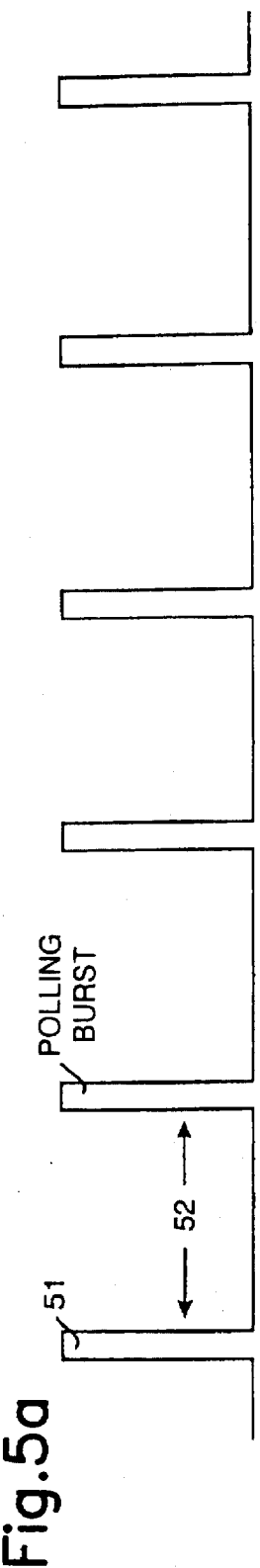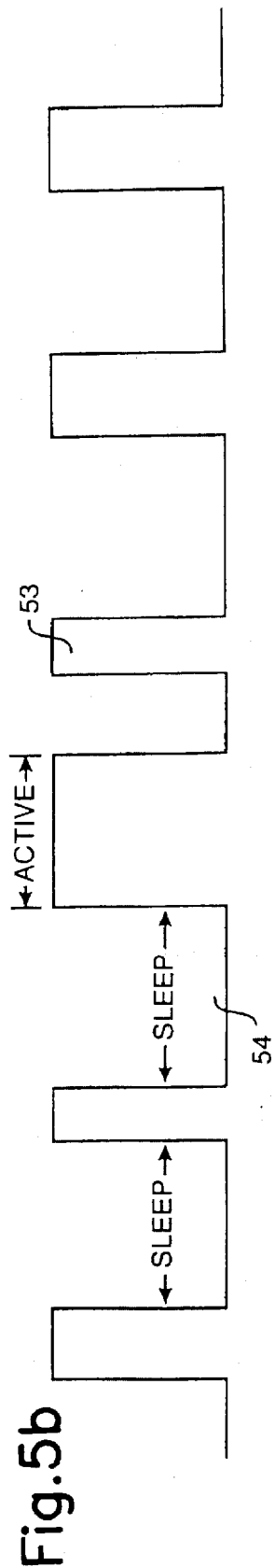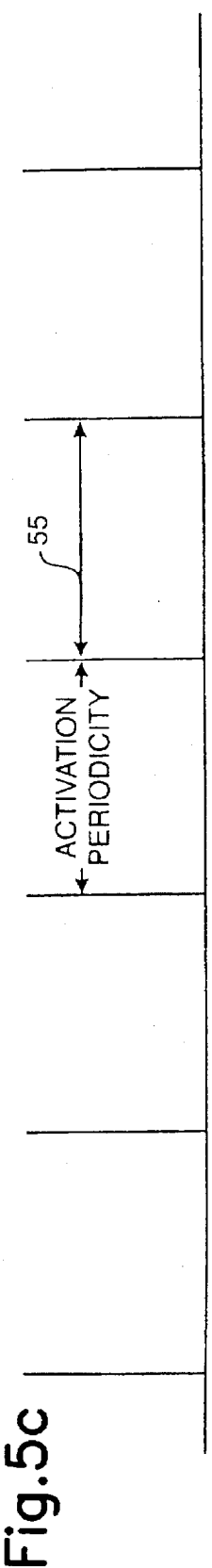

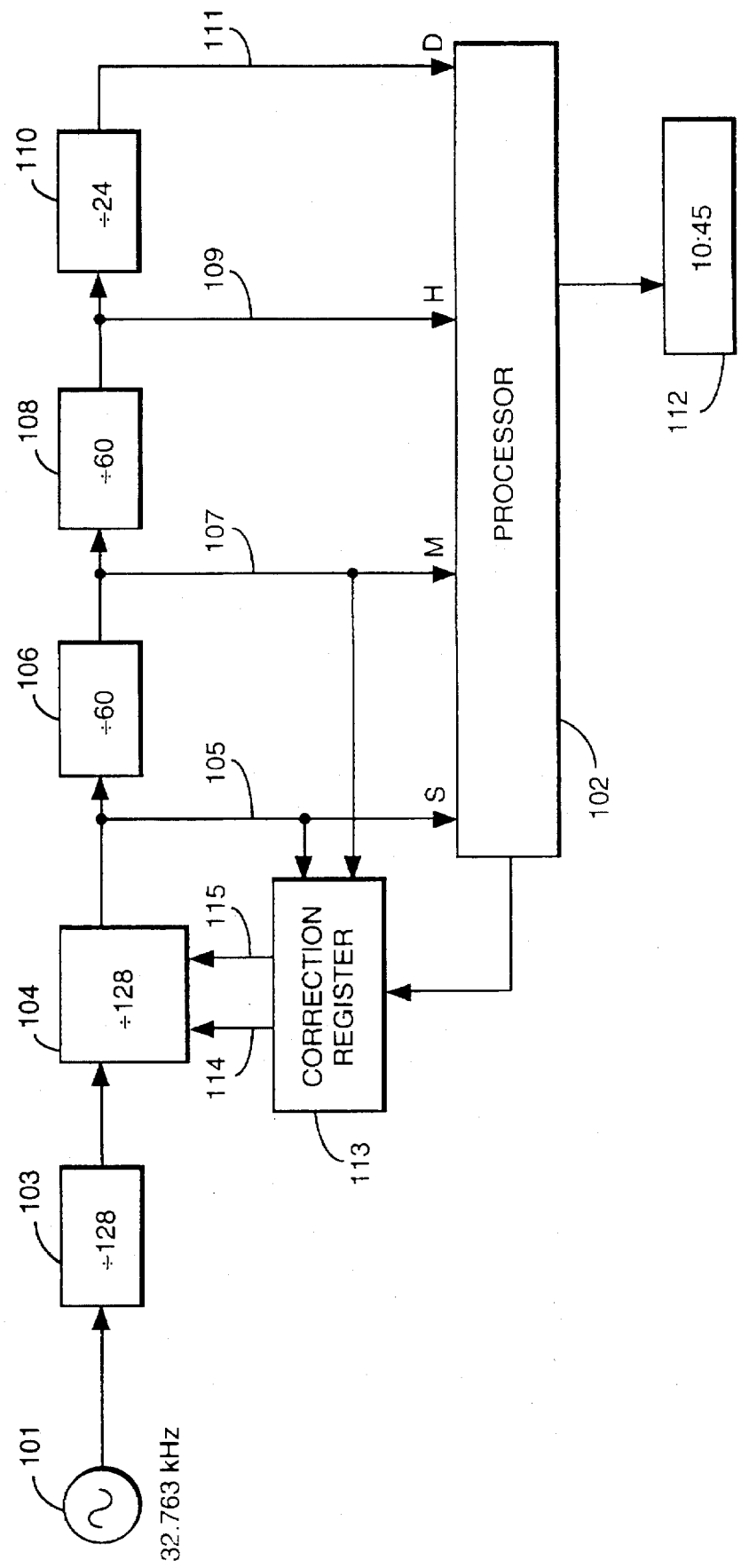

REAL TIME CLOCK

BACKGROUND OF THE INVENTION

The present invention relates to a real time clock arranged to generate output signals indicative of time of day.

General purpose watches and clocks are commonly fabricated around quartz oscillators, generating clock pulses at approximately 32 kHz or 64 kHz. The clock pulses are then divided by counters or similar devices to produce a one second tick, which in turn may be further divided to produce hour counts and day counts etc.

For most applications, clocks of this type are considered to be accurate enough, given that, in most countries, adjustments are made twice a year due to the adoption of light saving time in Summer months. However, in some applications, clocks of this type are not accurate enough, either because an accurate timing source is required for a particular application, or, given the nature of an equipment, it would be undesirable to generate a clock output which was perceived as being less than perfectly accurate.

SUMMARY OF THE INVENTION

According to a first aspect of the present invention, there is provided a real-time clock arranged to generate output signals indicative of time of day, comprising an oscillating device arranged to produce a first clocking signal, clock frequency adjustment means arranged to process the first clocking signal in response to a calibration value to produce an output clocking signal; and processing means arranged to re-calculate the calibration in response to external clocking signals received from a cellular base station for mobile telephones.

Thus, in the present invention, the clock is responsive to transmitted radio signals conveying accurate clocking source which is in turn used to calibrate the internal oscillator. Furthermore, it is not necessary for an independent network to be established for the purpose of providing calibration signals. Use is made of existing cellular networks for mobile telephones which, particularly in digital networks, are required to maintain accurate timing signals so as to facilitate accurate time division multiplexing within the network.

In a preferred embodiment, the output signals consist of pulses generated at 1 hertz, which may be counted to produce one pulse per minute which in turn may be counted to produce one pulse per hour.

Preferably, the oscillating device oscillates at a frequency of between 1 kHz and 1 MHz and the clock frequency adjustment means may be arranged to count a predetermined number of these clocking pulses determined by the calibrated value.

In a preferred embodiment, the clock is fabricated as part of a mobile telephone, wherein calibration with reference to the external clocking signal is performed when the mobile telephone is operational. Preferably, the mobile telephone has a high frequency system clock, processing means arranged to process polling signals received during a predetermined portion of a repeated periodic cycle, first counting means for counting system clock pulses, second counting means for counting said first clocking signal, means for reactivating a system clock after a calibrated number of first clocking signal pulses, means for reloading the first counting means and calibration means for calibrating the calibrated number by comparing the reloaded system clock count with base station timing signals.

BRIEF DESCRIPTION OF THE DRAWINGS

The invention will now be described by way of example only, with reference to the accompanying drawings, in which:

FIG. 5a, 5b, and 5c shows a timing diagram of polling bursts and activation periods;

FIG. 8 shows the sleep clock identified in FIG. 6, in combination with circuitry for producing real time clock signals.

DETAILED DESCRIPTION OF THE INVENTION

Figure 1:
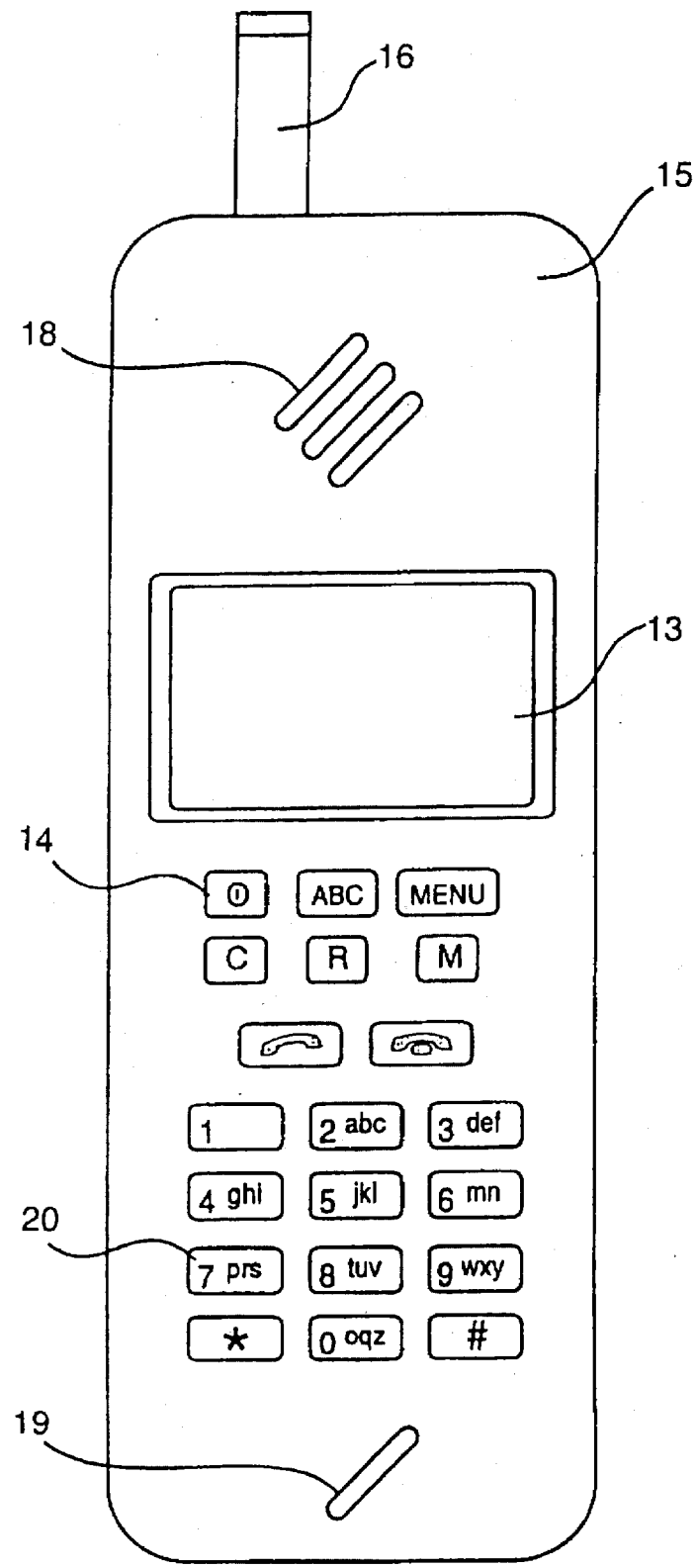
FIG. 1 shows a digital mobile telephone arranged to communicate with base stations using a frame structure to facilitate time division multiplexing.

A mobile telephone is shown in FIG. 1, contained within a plastic housing 15, with an antenna 16 extending from said housing to facilitate communication between the mobile telephone and cellular base stations. The telephone includes an earpiece 18 and a microphone 19, along with manually operable keys 20 and a liquid crystal display 13.

The telephone includes an on/off switch 14 such that, when not required, the telephone may be switched off so as to conserve battery power. A nickel-cadmium battery pack is attachable to the rear of the telephone and the ability to conserve battery power will significantly affect the duration between battery recharging or battery replacement.

When switched on, by operation of switch 14, the telephone has essentially two modes of operation. In a first mode, the telephone is placed in a stand-by condition. In this stand-by condition, the telephone is not usable as such but remains active, so that it is receptive to polling signals transmitted by base stations. Furthermore, it is also in a condition responsive to manual key operation. Thus, in its stand-by condition, the telephone is effectively waiting for a call to be established by the telephone user or by someone wishing to contact the telephone user.

When a call is set up either by the telephone user or by someone calling the user, the telephone must enter its second mode of operation, under which communication channels are established between the telephone and a cellular base station. The telephone communicates with base stations using an encoded digital time-multiplex, in which an allocated transmission frequency band is divided, over time, into a plurality of channel frames.

In its stand-by condition, it is not necessary for the mobile telephone to have channel bandwidth allocated thereto but, as previously stated, it is necessary for the telephone to receive polling signals from base stations, so that the telephone may be polled when a calling party attempts to establish a communication channel to the telephone.

The actual division of communication links into channel frames and the sub-division of these frames into data symbols involves a number of parameters which are selectable for particular communication standards and, to some extent, adjustable within these standards. Thus, a telephone may be programmed to be adaptable, such that the fully defined mode of operation is determined by a network, which in turn communicates with the mobile telephone so as to complete its programming for operation within that network. It should therefore be understood that many of the numerical values given in the following disclosure are only examples and that many modifications could be made while still falling within the scope of the present invention.

An operational network will have a plurality of radio frequencies allocated thereto and the total number of frequencies will determine the total number of calls which may be simultaneously connected within each particular cell. In addition to providing actual communication between mobile telephones and base stations, it is also necessary to transmit signalling commands, so as to facilitate the connection of calls and the switching of communications between base stations. The signalling instructions are also transmitted using the frame structure, therefore some frames will have a different character to that of others. It is necessary for the system, at any particular time, to be aware of the type of frame that is being transmitted, therefore the frame structure is repeated in a predictable way. Thus, each transmitted frame contains a fixed number of data symbols and a predetermined number of these frames constitute the total period of a repeated cycle.

Figure 2:
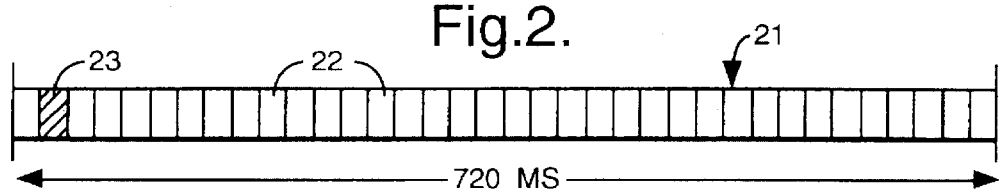
FIG. 2 illustrates a frame structure, consisting of thirty six repeated frames.

A group of repeated frames is referred to as a superframe or multiframe, and a superframe structure 2, for the present embodiment is shown in FIG. 2. The superframe is transmitted over 720 milliseconds and includes a total of thirty six frames 22. Frame 23, shown shaded in FIG. 2, includes polling information which may be considered as a burst of information identifying unique numbers for particular mobile telephones, thereby identifying telephones which are being called and require a call to be answered. Thus, when a mobile telephone is not actually communicating with a base station, a significant proportion of its operating circuitry may be de-activated so as to reduce power consumption. However, it is essential that, within each superframe, the telephone is capable of analysing information transmitted during each polling frame.

Figure 3:
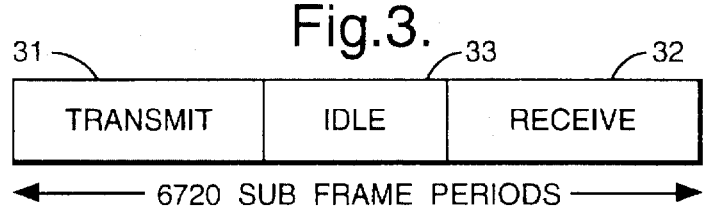
FIG. 3 shows the division of each of the frames illustrated in FIG. 2 into transmission and reception portions.

A frame 22 is detailed in FIG. 3 and consists of 6720 sub-frame periods. The sub-frame period frequency defines the output sample rate, therefore it is necessary for the output digital circuitry to produce an output value at the sub-frame period rate and, similarly, input signals are sampled at this rate. As shown in FIG. 3, each frame includes a transmit portion 31 and a receive portion 32, separated by an idle portion 33. Thus, during the transmit portion 31 data is transmitted from the mobile telephone to a base station at the sub-frame rate while, similarly, during the receive portion, data is received by the mobile telephone at this rate. Thus, the whole system operates within an accurately synchronised environment in which the clocking of signals within each mobile telephone must be synchronised to clocking signals generated by base stations.

Figure 4:
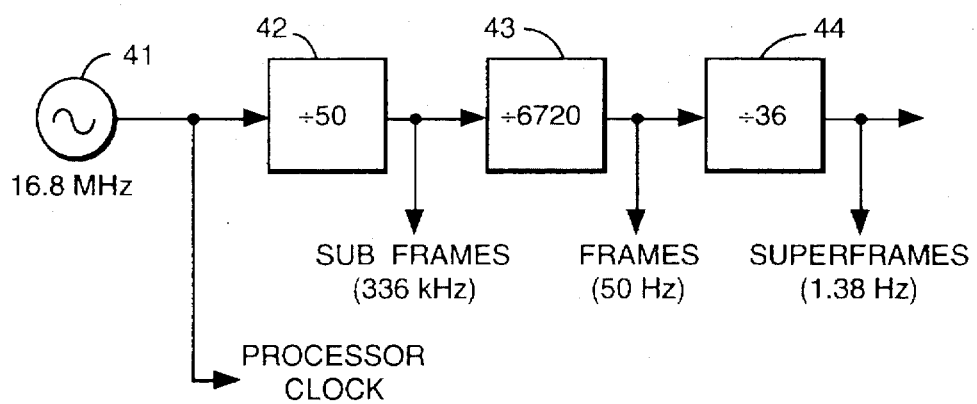
FIG. 4 shows a system clock along with counters for reducing the frequency of pulses generated by the clock.

The mobile telephone includes an accurate system clock arranged to produce clocking signals at 16.8 MHz. Internal circuitry within the mobile telephone, including a digital signal processing circuit, receives these processor clock signals directly and executes instructions in response to these signals. Timing signals, to identify the start of sub-frames, frames and super frames, are generated by counting system-clock signals in a cascaded chain of counters or frequency dividers. Such a chain is illustrated in FIG. 4.

An output from a system clock 41 at 16.8 MHz is supplied to a first frequency divider 42 arranged to divide the system clock's frequency by 50. Thus, the first counter 42 produces sub-frame clocks at 336 kHz, each identifying the start of a sub-frame period, as shown in FIG. 3. The output from counter 42 is also supplied to a second counter 43, arranged to divide the clock frequency by 6720. Referring to FIG. 3, it can be seen that each frame is made up of 6720 sub-frame periods, therefore the output from counter 43 produces clocking signals at the frame rate of 50 Hz. Similarly, the output from counter 43 is supplied to a third counter 44, arranged to divide the clocking frequency by 36, to produce superframe clocks at 1.38 Hz.

At any particular instance, the output from counters 42, 43 and 44 identifies a particular sub-frame period, within a particular frame of a superframe. These values are also compared with reference signals received from base stations and, where appropriate, modifications are made to the counters so as to bring the operation of the mobile telephone accurately into phase with network clocks. Thus, during each superframe cycle, the mobile telephone may compare its internal clocking signals with network clocks, to ensure that the operation of the mobile telephone is accurately synchronised to the network.

When placed in its stand-by condition, the system clock and much of the processing circuitry may be de-activated for substantial portions of each superframe, provided that circuitry is re-activated so as to be ready to receive polling information during the polling frames 23. These polling bursts are illustrated diagrammatically in FIGS. 5a–5c. Referring to FIG. 5a, each polling burst 51 represents a period during which the telephone must be active and capable of receiving and analysing information transmitted during the polling burst. At other times, during intervals 52, it is not necessary for the telephone to communicate with base stations, given that no polling information is being transmitted. However, the telephone may be required to perform other processing operations, therefore it will be necessary for the telephone to remain active for a short period after the transmission of the polling burst. Similarly, the operation of the telephone must have stabilised prior to the polling burst being transmitted, therefore it is necessary for the system clock to be activated slightly before the polling burst is transmitted.

Periods during which a telephone must be placed in an active condition are illustrated, in FIG. 5b, as active periods 53. Each active period 53 starts at a predetermined interval before a polling burst 51 is transmitted. The telephone remains active throughout the transmission of the polling burst 51 but may then be de-activated after processing has been completed. Thus, between each active pulse 53 a duration is provided, identified as sleep duration 54, during which the system clock is de-activated, thereby effectively placing the telephone into a sleep condition.

It can be appreciated from FIG. 5b that the duration of the active intervals is variable, given that the degree of processing required by the telephone will also vary from cycle to cycle. In order for the system clock to be de-activated, a lower frequency sleep clock is included, which may be calibrated with reference to the system clock. In previous systems, a routine is included that calculates the duration of the subsequent sleep period 54 during each active period 53. The system clock may then be de-activated and the system placed in its sleep condition for the appropriate duration 54-, as measured by the low frequency sleep clock.

In the present embodiment an improved approach is provided to placing the system clock into its sleep condition. As previously stated, and as shown in FIG. 5b, the sleep durations 54 are variable and the optimum point at which the system clock may be placed in its sleep mode will vary relative to the cycle phase. However, in the present embodiment, exploitation is made of the fact that the point at which re-activation is required does not need to vary with reference to the cycle phase. Thus, the duration of active pulses 53 is variable because the point at which de-activation occurs varies with reference to the cycle phase. However, with reference to FIGS. 5a–5c and by comparing activation periods 53 with polling bursts 51, it can be noted that the optimum reactivation point does not vary with reference to the cycle phase. Thus, in preference to calculating variable sleep durations for each sleep cycle, an activation periodicity 55 is calculated.

The sleep clock is calibrated with reference to the cycle clock, preferably on each cycle. Thus, the sleep clock is now arranged to calculate durations representing the periods between re-activation points. Circuitry is included which counts a predetermined number of sleep clock pulses during each cycle, so as to produce a re-activation pulse at the required point. Thus, the processor is arranged to effect a de-activating routine after completing the processing required for that particular cycle. In this way, de-activation occurs at the optimum point, after cycle processing, and it is not necessary to calculate a sleep duration. Re-activation then occurs at the predetermined position within the repeated cycle in anticipation of receiving polling signals. Thus, re-activation occurs prior to the polling burst being transmitted, allowing the circuitry to power up and stabilise.

Figure 6:
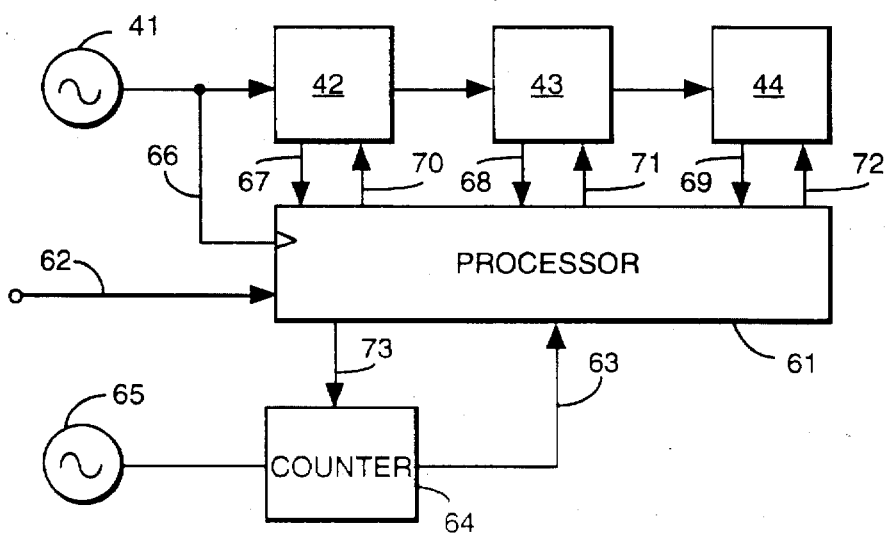
FIG. 6 shows the system clock and counters of FIG. 4, in combination with the processor and sleep clock circuitry.

The system clock 41 and its associated counters 42, 43 and 44 are also shown in FIG. 6. These devices communicate with a digital signal processor 61, which in turn receives external timing signals from base stations via an input line 62. The processor 61, the system clock 41 and associated counters 42, 43, and 44 may be placed into a sleep mode, during which the system clock 41 ceases to operate until re-activated by an interrupt signal supplied on a line 63 to the processor 61 from an adjustable counter 64. The adjustable counter in turn receives sleep clock pulses from a low frequency sleep clock 65, operating at 32.763 kHz.

The system clock 41 clocks processor 61 via a clocking line 66. Counter 42 counts clock pulses from the system clock 41 to generate indications of the start of a sub-frame period, that are supplied to the processor 61 over a data line 67. These reduced frequency clocking pulses are also supplied to counter 43, which in turn supplies indications of the start of frame periods to the processor 61 over line 68. Similarly, counter 44 receives an output from counter 43, as previously described, resulting in indications of the start of superframe periods being supplied to the processor 61 over a line 69.

If so required, the processor 61 may keep a count of superframe periods but it should be appreciated that superframes represent the totality of a repeated cycle and each superframe contains a polling burst.

In addition to receiving signals from counters 42, 43 and 44 over line 67, 68 and 69 respectively, the processor 61 is also arranged to supply new count values to said counters over lines 70, 71 and 72 respectively. Thus, after the system clock 41 has been placed in its sleep mode, the system phase may be restored by downloading new count values to the counters, whereafter they may be reactivated so as to continue counting signals generated by the system clock 41. In an alternative configuration, lines 67, 68, 69, 70, 71 and 72 are replaced by a bus and communication is effected between the processor 61 and counters 42, 43 and 44 by address signals being generated by the processor 61 so as to identify a specific one of said counters.

The processor 61 also includes routines for checking that the counters 42, 43 and 44 are in phase with signals received from base stations, via line 62. Thus, the processor 61 may compare its Local system phase with the network system phase and, where appropriate, modify count values, via data line 70, 71 or 72, so as to bring the count values into phase with the overall network. Thus, the processor 61 is capable of establishing the extent to which its own local system clock count may have drifted from the normal operating phase of the network.

The sleep clock 65 generates sleep clock pulses that are in turn counted by the variable counter 64. The variable counter is controlled by the processor 61, which supplies a count value over line 73. The variable counter 64 is arranged to produce activation pulses at the activation periodicity 55, shown in FIG. 5e by reducing the pulse frequency of the sleep clock. Thus, after counting a number of sleep pulses defined by the value supplied over line 73, the counter 64 generates a re-activation pulse over interrupt line 63, which in turn instructs the processor 61 to re-activate the system if said system has been placed in its sleep mode.

Figure 7:
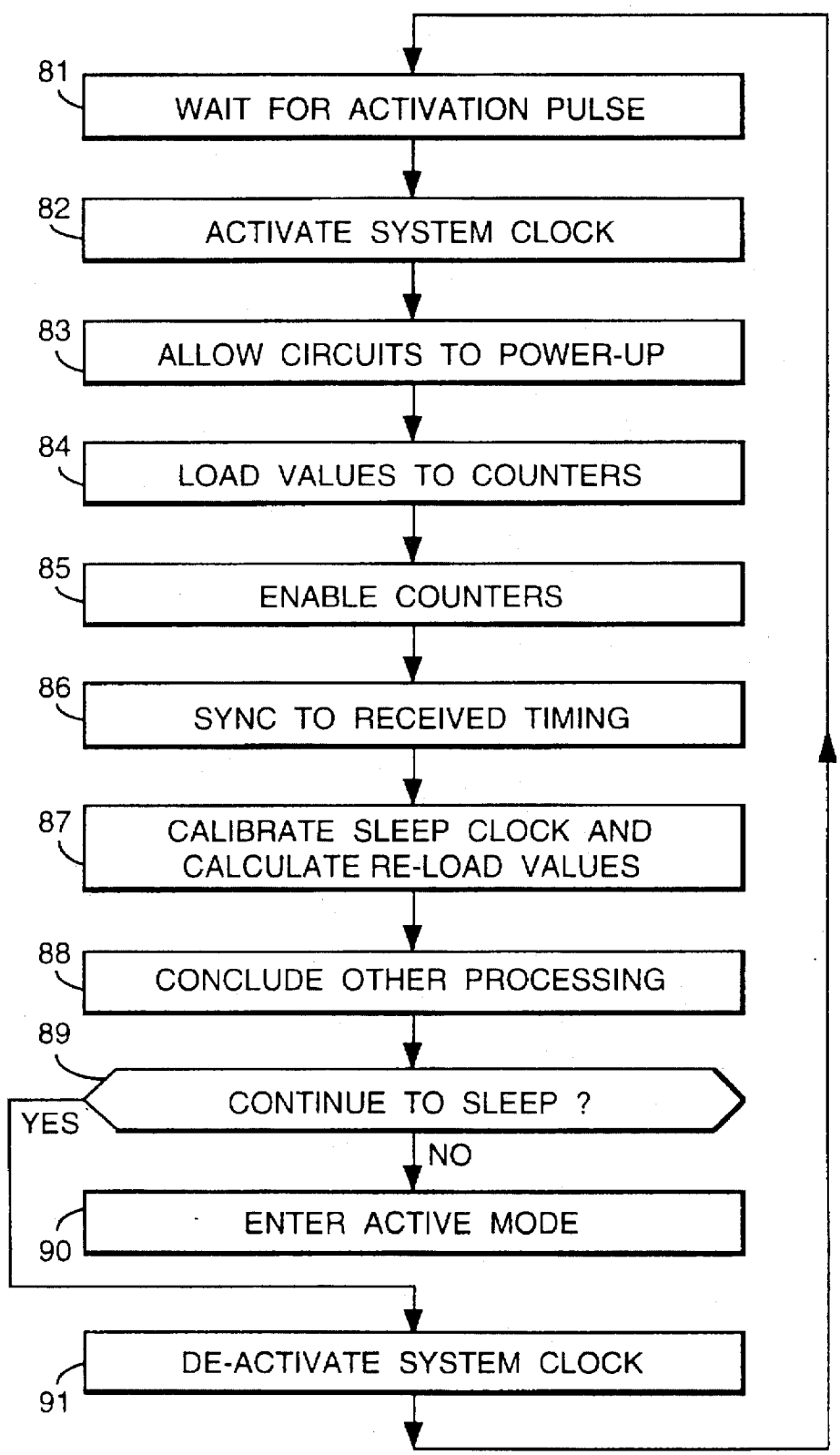
FIG. 7 illustrates procedures executed in order to facilitate operation of the sleep clock shown in FIG. 6.

Operation of the system shown in FIG. 6 will be described with reference to the procedure detailed in FIG. 7. Step 81 represents the processor 61 and system clock 41 in sleep mode, during which the system clock 41 is inactive. Thus, the processor 61 is effectively waiting for an activation pulse which, when received via line 63, activates the system clock 41.

At step 83, after activation of the system clock, a short interval is provided, during which circuitry is allowed to power up and stabilise, such that normal processing may be resumed.

Prior to the resumption of normal processing, creating conditions such as to re-establish operation of the processor 61 and system clock 41 as if they had not been placed in sleep mode, the counters 42, 43 and 44 are re-loaded with new values, via data lines 70, 71 and 72 respectively. Thus, the processor 61 and system clock 41 are placed in sleep mode until the re-activation point. The period between re-activation points is specified in terms of a calibrated number of sleep clock pulses. Similarly, at the re-activation position, the system clock counters 42, 43 and 44 should have attained a specified number of system clock counts. Thus, when re-activation occurs, as determined by the sleep clock 65 and counter 64, the values which the counters 42, 43 and 44 would have attained, had the system not been placed into its sleep condition, are effectively re-loaded, such that the said counters may then continue to count as if the sleep condition had not occurred.

Thus, after the counters 42, 43 and 44 have been loaded with new values they are enabled at the appropriate point so as to bring them into phase with the operating environment.

At step 86 the phase of the system counters 42, 43 and 44 is compared with external timing signals received over line 62. If necessary, modifications are made to the values stored in counters 42, 43 and 44 which, under normal operating conditions, would generally result in minor modifications being made to the sub-frame count of counter 43, it generally not being necessary to correct counter 42.

The duration of a sleep clock pulse will not tend to represent an integer number of system clock pulses. Thus, the re-activation points will tend to drift, with reference to the optimum point defined in terms of system clock pulses, therefore re-calibration is required on a continual basis.

Consequently, on each cycle, a re-calibration procedure is effected by making reference to the extent to which the system counters 42, 43 and 44 and in particular counter 43, are out of phase with the external timing signals received over line 62. Thus, in response to this calibration, it may be determined that the sleep clock has effectively slowed down, in which case fewer counts are required by counter 64 in order to re-activate the system clock at the optimum point. Alternatively, the sleep clock may be perceived as having speeded up slightly, in which case fewer counts are required.

Even while sleep clock 65 remains oscillating at constant frequency, the activation point will tend to drift relative to the system clock phase, therefore occasionally a cycle is required in which fewer counts are made by counter 64 or more counts are made by counter 64. Thereafter, the count is re-adjusted on the next cycle and the process continues. Thus, the activation point, as determined by counter 64, may drift slightly with reference to the optimum point defined in terms of system clock pulses but, on each cycle, it may be modified such that the activation point, defined by the sleep clock, does not drift beyond an extent to which it is possible for the processor 61 to recover the situation, with reference to timing signals received from a base station.

Thus, after step 87, whereupon the sleep clock is calibrated and a new count number supplied to counter 64, other processing steps required within the cycle are concluded and at step 89 a question is asked as to whether sleep mode should be maintained.

The conclusion of other processing at step 88 involves examining data received in the polling burst and this data may represent a call to the mobile telephone, requesting the establishment of a connection to a base station. Under these conditions, the question asked at step 89 is answered in the negative and the active mode is entered at step 90, under which the system clock 41 is maintained operative and measures are undertaken to establish a call.

Alternatively, if the telephone is not required to establish a call to a base station, resulting in the question asked at step 89 being answered in the affirmative, control is directed to step 91, whereupon the system clock is deactivated and the system returned to its sleep mode.

Thus, it can appreciated from the above, that the system provides continual re-calibration of the sleep clock, thereby ensuring that sleep durations are optimised and that the processor 61 is always re-activated in anticipation of polling bursts.

A system described above allows accurate timing to be effected using a relatively inexpensive low frequency sleep clock, effectively synchronised to external signals received from mobile base stations. In addition to, or as an alternative to, calculating durations relative to cycles of the high frequency system clock, the calibration procedure may also be exploited to provide real time clock signals. A system for displaying a real time clock output is shown in FIG. 8.

An oscillating device 101 is shown which may be the same as the sleep clock 65 shown in FIG. 6. Processor 102 is substantially similar to processor 61 shown in FIG. 6 and processor 102 is arranged to supply system clock count values to counters, similar to counters 42, 43 and 44, so that said values may be compared with signals received from base stations after the system has been re-activated from its sleep mode operation. Thus, and as part of each re-activation cycle, the sleep clock 65 is re-calibrated and a re-calibration value is supplied to a counter, similar to counter 64 shown in FIG. 6. This calibration value effectively represents an extent to which the frequency of the signals produced by clock 101 have departed from their nominal oscillation value. The system shown in FIG. 8 uses this value to determine the extent to which circuitry arranged to provide a real time clock output needs to be modified in order to improve the accuracy of said output.

The output from the clock 101 is supplied to a first counter 103 which effectively divides the pulse frequency by 128. The output from counter 103 is supplied to a second counter 104 which nominally divides the clock frequency by 128 to produce a notional output frequency at 1 Hz. This 1 Hz signal provides a one second tick over a line 105 to the processor 102. The one second tick is also supplied to a further counter 106 which divides a count frequency by 60 to provide a minute tick over line 107 to the processor 102. This minute tick is also supplied to a further counter 108 to generate an hour tick which is supplied to the processor 102 over line 109. Similarly, this hourly tick is supplied to a final counter 110 to produce a daily tick over line 111 which is also supplied to the processor 102. Thus, in response to receiving a clocking pulse each second, minute, hour and day, the processor 102 generates an output signal which is supplied to a clock display 112.

The clock display may take the form of the liquid crystal display B and the clock may be displayed on this display when the telephone is in an inactive mode or, alternatively, when the telephone is actually switched off. Under these circumstances, switching off the telephone results in the circuitry shown in FIG. 6 being de-activated, with the exception of the sleep clocks 65. The circuitry shown in FIG. 8 remains active and clock pulses produced by the source 101 continue to be counted so as to maintain the real time clock. Similarly, back-up batteries are provided within the telephone, such that power is maintained to the real time clock when the main battery pack is removed and the internal battery may be re-charged with power received from the removable battery pack.

Re-calibration will only take place when the telephone is active and in its stand-by mode. Thus, increased operation of the telephone will result in the clock maintaining greater accuracy and continual operation of the telephone should achieve extremely good accuracy, comparable with that provided by the network clocks.

Calibration of the real time clocking circuitry shown in FIG. 8 is effected by means of a correction register 113. The correction register is arranged to supply signals to counter 104 over a first line 114 or over a second line 115. When no signals are being supplied over lines 114 or 115, counter 104 counts 128 signals received from counter 103 before generating a 1 Hz tick. However, when a signal is supplied to counter 104 over line 114, the counts value counted by counter 104 is increased, thereby effectively slowing down the operation of the clock. Similarly, when a signal is supplied over line 115, the number of counts counted by counter 104 is reduced, thereby speeding up the operation of the real time clock.

The correction register contains eight bits of information along with combinational logic arranged to generate signals suppliable to the counter 104 over lines 114 and 115. A first bit specifies whether counts are to be added or subtracted, that is to say, whether signals are required over line 114 or over line 115. The second bit defines the precision of modifications, that is to say, whether the number of clock pulses to be added or subtracted is measured in single units or in pairs of units. Thus, clock counts may be increased by 128 or 256 of the original output signals generated by clock 101.

The remaining six bits held within the correction register specify the number of minutes within each hour during which a correction is to be made.

Minute ticks generated by counter 106 are supplied, via line 107 to the correction register 113. Similarly, second ticks are also supplied to the correction register 113 via line 105. In this way, the correction register is arranged to increase or decrease the number of counts made by counter 104 for the sixtieth second, for n minutes of the hour.

Thus, the processor 102 will have received calibration information specifying the accuracy of clock 101. This calibration information is processed to produce correction values which are in turn supplied to the correction register 113. For example, the calibration procedure may have determined that it is necessary to increase the clock count for counter 104 for four minutes in the hour by one clock count. Thus, at the start of each hour, the system operates normally and counter 104 counts clocks received from counter 103. However, during the first minute of the hour the sixtieth second of this minute is effectively stretched by increasing the count of counter 104 to 129.

During the first fifty nine seconds, no signals are supplied over lines 114 and 115. However, as soon as counter 104 starts counting for the sixtieth second of the minute, a signal is supplied over line 114, thereby increasing the count for counter 105 to 129. Thus, the final second of the first minute is increased slightly. This procedure is repeated for the subsequent second, third and fourth minute, whereafter normal operation is resumed.

Calibration of the clock in this way will continue to be effected until new calibration signals are calibrated by the system and downloaded to the correction register 113. Thus, in this way, it can be seen that calibration is maintained while the remaining circuitry is de-activated. However, re-calibration only takes place when the system has been activated therefore maintaining the activation of the overall system will improve the overall accuracy of the real time clock.

In a preferred embodiment the system is arranged to provide a real time clock within a mobile telephone device. However, in an alternative embodiment, the circuitry may be provided essentially to provide a real time clock and use may be made of signals received from mobile base stations, exclusively for the purpose of maintaining the accuracy of the real time clock.

What is claimed is:

1. A real time clock for generating output clocking signals indicative of a time of day, comprising:

a first oscillating device for continuously producing a first clocking signal;

a second oscillating device for producing a second cocking signal during an on-period of operation;

clock frequency adjustment means for processing said first clocking signal and for producing said output clocking signals, said adjustment means being responsive to a calibration value; and processing means for periodically re-determining said calibration value during said on-period of operation, said calibration value being determined by comparing said second clocking signals to external clocking signals derived from a periodic transmission structure transmitted by a cellular base station for mobile telephones.

2. A real time clock according to claim 1, wherein said output clocking signals include pulses generated at 1 Hz.

3. A real time clock according to claim 2, wherein said 1 Hz pulses are counted to produce a one pulse per minute output clocking signal.

4. A real time clock according to claim 3, wherein said one pulse per minute output clocking signals are counted to produce a one pulse per hour output clocking signal.

5. A real time clock according to claim 1, wherein said first oscillating device oscillates at a frequency of between 1 kHz and 1 MHz.

6. A real time clock according to claim 1, wherein said clock frequency adjustment means counts a predetermined number of said first clocking signals, said predetermined number being determined by said calibration value.

7. A real time clock according to claim 6, wherein said predetermined number is a nominal value which is increasable or decreasable by said calibration value.

8. A real time clock according to claim 7, wherein said nominal value is adjusted by said calibration value at a predetermined number of real time clock counts.

9. A real time clock according to claim 8, wherein said nominal value is adjusted by said calibration value for a calibrated number of minutes in each hour.

10. A mobile telephone having a real time clock for generating output clocking signals indicative of a time of day, comprising:

a first oscillating device for continuously producing a first clocking signal;

a second oscillating device for producing a second clocking signal during an on-period of operation;

clock frequency adjustment means for processing said first clocking signal and for producing said output clocking signals, said adjustment means being responsive to a calibration value; and processing means for periodically re-determining said calibration value, said calibration value being determined by comparing said second clocking signal to external clocking signals derived from a periodic transmission structure transmitted by a cellular base station for mobile telephones;

wherein said calibration with reference to said external clocking signal is performed during said on-period of operation of said mobile telephone.

11. A mobile telephone having a real time clock according to claim 10, wherein said second oscillating device is a high frequency system clock, said mobile telephone further comprising:

processing means for processing polling signals received during a predetermined portion of a repeated periodic cycle;

first counting means for counting said second clocking signals;

second counting means for counting said first clocking signal;

means for re-activating said system clock after a calibrated number of first clocking signal pulses;

means for re-loading said first counting means wherein a re-loaded system clock count is achieved; and calibration means for calibrating said calibrated number of first clocking signal pulses by comparing said re-loaded system clock count with said external clocking signals.

12. A mobile telephone according to claim 11, wherein said system clock is deactivated after the completion of processing operations performed during each of said repeated periodic cycles.

13. A mobile telephone according to claim 12, wherein said system clock is reactivated at a predetermined position within each of said repeated periodic cycles.

14. A method for generating output clocking signals indicative of a time of day using a mobile telephone having a real time clock, comprising the steps of:

continuously producing a first clocking signal from a first oscillating device;

producing a second clocking signal from a second oscillating device during an on-period of operation;

adjusting the first clocking signal by means of a calibration value; processing the adjusted first clocking signal to produce the output clocking signals;

periodically re-determining the calibration value during the on-period of operation, wherein the calibration value is re-determined by comparing the second clocking signals to an external clocking signal derived from a transmission structure transmitted by a cellular base station for mobile telephones.

15. A method for generating output clocking signals indicative of a time of day according to claim 14, wherein the second clocking signals are produced from a high frequency system clock, the method further comprising the steps of:

de-activating the system clock during a first portion of a repeated periodic cycle;

processing polling signals received during a second, predetermined portion of the repeated periodic cycle;

counting the first clocking signals;

counting the second clocking signals;

wherein after counting a calibrated number of first clocking signals, re-activating the system clock during a third portion of the repeated periodic cycle such that the third portion includes the duration of the second portion of the repeated periodic cycle and the first portion of the repeated period cycle begins when the duration of the third portion elapses;

determining a re-activated second clocking signal count; and re-determining the calibrated number of first clocking signals counted by comparing the re-activated second clocking signal count to the external clocking signal received from the cellular base station for mobile telephones.

16. A method for generating output clocking signals indicative of a time of day according to claim 15, wherein the step of re-activating the system clock during a third portion of the repeated periodic cycle further comprises the steps of:

powering-up circuits of the mobile phone during a fourth portion of the repeated periodic cycle, the duration of the fourth portion elapsing with the start of the second, predetermined portion of the repeated periodic cycle; and performing processing operations during a fifth portion of the repeated periodic cycle, the fifth portion beginning when the duration of the second, predetermined portion of the repeated periodic cycle elapses;

wherein the duration of the second, fourth and fifth portions of the repeated period cycle define the duration of the third portion of the repeated periodic cycle.

17. A method for generating output clocking signals indicative of a time of day according to claim 16, wherein the first portion of a repeated periodic cycle defines a sleep period and the third portion of the repeated periodic cycle defines an active period, wherein the active period is predetermined within the repeated periodic cycle.

* * * * *